(12) United States Patent
Qazalbash

(10) Patent No.: US 11,183,890 B2
(45) Date of Patent: Nov. 23, 2021

(54) PERMANENT MAGNET VEHICLE TRACTION MOTOR HAVING IMPROVED VIBRATION, TORQUE RIPPLE, AND TOTAL HARMONIC DISTORTION

(71) Applicant: Arfakhshand Qazalbash, Auburn Hills, MI (US)

(72) Inventor: Arfakhshand Qazalbash, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 97 days.

(21) Appl. No.: 16/591,163

(22) Filed: Oct. 2, 2019

(65) Prior Publication Data
US 2021/0104922 A1 Apr. 8, 2021

(51) Int. Cl.
| | |
|---|---|
| H02K 1/22 | (2006.01) |
| H01F 7/02 | (2006.01) |
| H02K 7/00 | (2006.01) |
| H02K 51/00 | (2006.01) |
| H02K 1/17 | (2006.01) |

(52) U.S. Cl.
CPC ............ *H02K 1/223* (2013.01); *H01F 7/021* (2013.01); *H02K 1/17* (2013.01); *H02K 7/006* (2013.01); *H02K 51/00* (2013.01)

(58) Field of Classification Search
CPC .......... H02K 1/223; H02K 1/17; H02K 7/006; H02K 51/00; H01F 7/021
USPC ............ 310/156.49, 156.53, 156.56, 156.57, 310/156.83
See application file for complete search history.

(56) References Cited

U.S. PATENT DOCUMENTS

| | | | | |
|---|---|---|---|---|
| 5,731,647 | A * | 3/1998 | Schuller | H02K 1/2746 310/114 |
| 6,590,312 | B1 * | 7/2003 | Seguchi | B60L 15/2009 310/266 |
| 6,984,909 | B2 * | 1/2006 | Kadoya | H02K 1/146 310/185 |
| 7,091,643 | B2 | 8/2006 | Burgbacher | |
| 7,282,827 | B2 * | 10/2007 | Futami | H02K 1/276 310/156.48 |
| 7,741,750 | B1 | 6/2010 | Tang | |
| 8,102,091 | B2 * | 1/2012 | Ionel | H02K 1/2766 310/156.53 |
| 8,154,167 | B2 | 4/2012 | Tang | |
| 9,178,392 | B2 * | 11/2015 | Yabe | H02K 1/2706 |
| 9,509,240 | B2 | 11/2016 | Holveck | |

(Continued)

*Primary Examiner* — Naishadh N Desai
(74) *Attorney, Agent, or Firm* — Ralph E. Smith

(57) ABSTRACT

A permanent magnet electric motor for a vehicle comprises a stator comprising a round wire defining N portions and a stator lamination defining an inner surface, N slots, and N/2 alternating, full-slot-width apertures in the inner surface, wherein the N portions of the round wire are disposed in the N slots, respectively, and a rotor comprising M permanent magnet assemblies defining M respective poles, each of the M permanent magnet assemblies comprising a pair or bar magnets arranged in a V-shaped configuration with respect to each other, wherein N equals 6 and M equals 4 or N and M equal respective double multiples thereof, and a rotor lamination having the M permanent magnet assembles disposed therein and defining, for each of the M permanent magnet assemblies, at least three sets of air pockets disposed proximate to the respective permanent magnet assembly.

12 Claims, 3 Drawing Sheets

(56) References Cited

U.S. PATENT DOCUMENTS

| | | | |
|---|---|---|---|
| 10,211,692 B2* | 2/2019 | Kuo | H02K 1/2766 |
| 10,355,537 B2* | 7/2019 | Zhu | H02K 15/03 |
| 10,432,047 B2* | 10/2019 | Liang | H02K 1/276 |
| 10,749,391 B2* | 8/2020 | Degner | H02K 1/2766 |
| 2001/0011851 A1* | 8/2001 | Asao | H02K 3/12 |
| | | | 310/179 |
| 2004/0007930 A1* | 1/2004 | Asai | H02K 1/2746 |
| | | | 310/156.53 |
| 2007/0182258 A1* | 8/2007 | Klaussner | H02K 3/50 |
| | | | 310/43 |
| 2007/0257576 A1* | 11/2007 | Adaniya | H02K 1/276 |
| | | | 310/156.53 |
| 2010/0026132 A1* | 2/2010 | Ooiwa | H02K 3/12 |
| | | | 310/201 |
| 2011/0127859 A1 | 6/2011 | Amrhein et al. | |
| 2014/0217849 A1* | 8/2014 | Soma | H02K 1/276 |
| | | | 310/156.53 |
| 2015/0188400 A1 | 7/2015 | Kemp et al. | |
| 2018/0056767 A1* | 3/2018 | Dolgov | B60K 17/043 |

\* cited by examiner

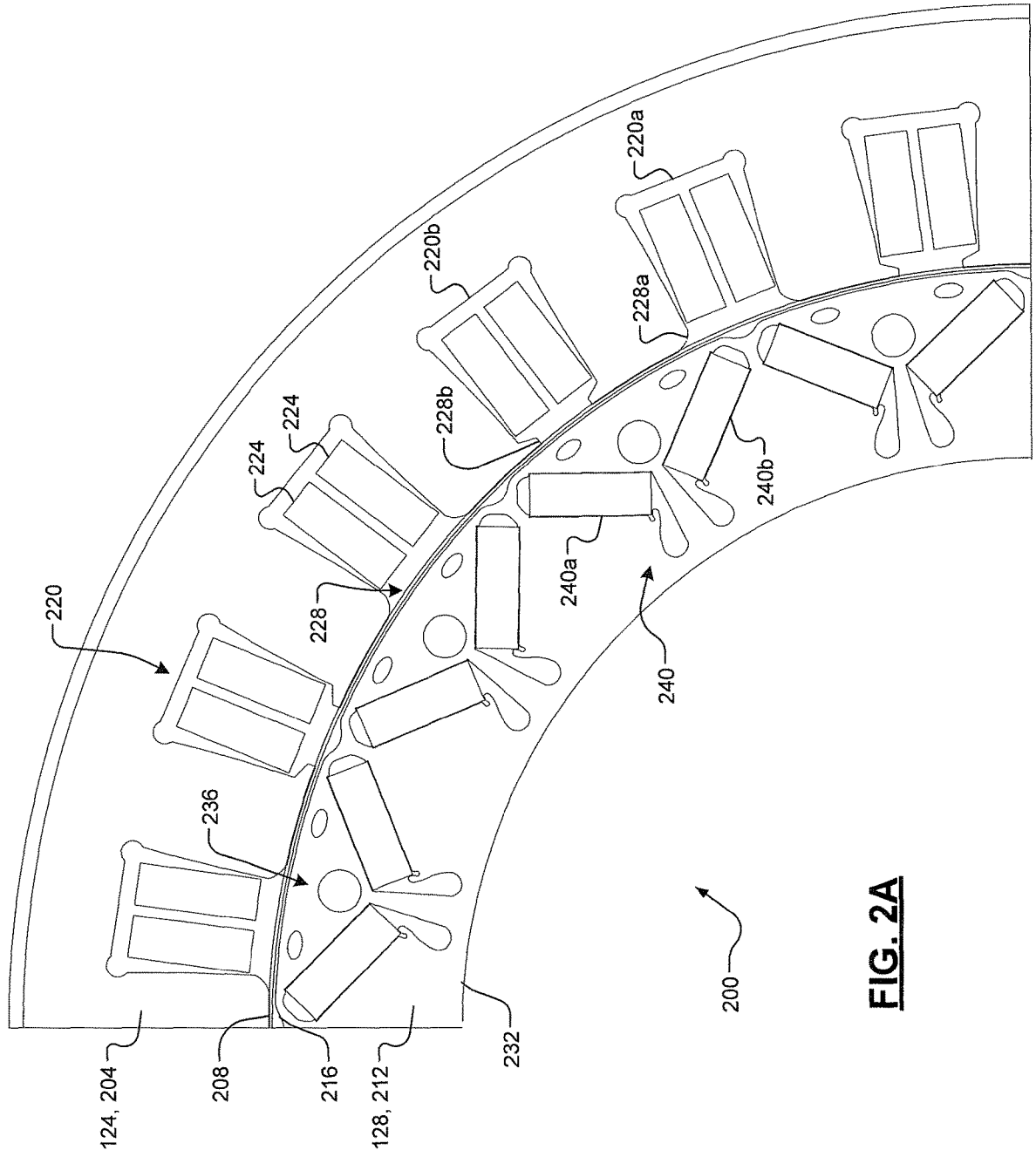

PERMANENT MAGNET VEHICLE TRACTION MOTOR HAVING IMPROVED VIBRATION, TORQUE RIPPLE, AND TOTAL HARMONIC DISTORTION

FIELD

The present application generally relates to permanent magnet traction motors for vehicles and, more particularly, to a permanent magnet traction motor having improved noise/vibration/harshness (NVH) characteristics, torque ripple, and total harmonic distortion (THD).

BACKGROUND

A permanent magnet electric motor is a type of electric motor that uses permanent magnets rather than electromagnetic coils (also known as "field windings") that are commonly found in an induction motor. For electrified vehicle applications, it is desirable for permanent magnet electric motors to be capable of generating a substantial amount of drive torque continuously for at least a certain period of time, e.g., 10 seconds. Achieving these high levels of drive torque, however, has various drawbacks, such as high voltage total harmonic distortion (THD). By modifying the design or configuration of conventional permanent magnet electric motors to mitigate or eliminate high voltage THD, their maximum drive torque typically ends up being reduced. This reduction in drive torque could be compensated for by increasing the motor size/displacement, but this is at the expense of cost/weight/packaging size. Accordingly, while these conventional permanent magnet electric motors do work well for their intended purpose, there remains a need for improvement in the relevant art.

SUMMARY

According to one example aspect of the invention, a permanent magnet electric motor configured to generate an output torque for a vehicle is presented. In one exemplary implementation, the motor comprises: a stator comprising a round wire defining N portions and a stator lamination defining an inner surface, N slots, and N/2 apertures in the inner surface, the N/2 apertures being aligned with and adjacent to every other of the N slots and being full-width relative to the respective N/2 slots, wherein the N portions of the round wire are disposed in the N slots, respectively, and a rotor comprising: M permanent magnet assemblies defining M respective poles, each of the M permanent magnet assemblies comprising a pair or bar magnets arranged in a V-shaped configuration with respect to each other, wherein N equals 6 and M equals 4 or N and M equal respective double multiples thereof, and a rotor lamination having the M permanent magnet assembles disposed therein and defining, for each of the M permanent magnet assemblies, at least three sets of air pockets disposed proximate to the respective permanent magnet assembly.

In some implementations, the at least three sets of air pockets comprise at least: a pair of first air pockets arranged proximate to an outer surface of the rotor lamination between two neighboring poles of the M poles and a pair of second air pockets and a single third air pocket arranged within the respective one of the M poles between the respective pair of bar magnets. In some implementations, the first and second air pockets each define an elliptical shape, and wherein the third air pockets define a circular shape.

In some implementations, the second and third air pockets act as a flux barrier and an optimizing flux path. In some implementations, the first air pockets are machined into or cut from the outer surface of the rotor lamination. In some implementations, each second and third air pocket is formed by first forming larger pockets in the rotor lamination, inserting the bar magnets therein, and then partially filling the larger pockets with a non-metallic epoxy, wherein non-filled portions of these larger pockets form the second and third air pockets.

In some implementations, the stator lamination further defines another N/2 apertures for a remaining N/2 slots of the N slots, and wherein the other N/2 apertures are partial-width apertures relative to the respective N/2 slots. In some implementations, N equals 24 and M equals 16. In some implementations, the output torque of the motor at its base speed is approximately 133 Newton-meters (Nm) and the output torque of the motor at its maximum speed is approximately 51 Nm. In some implementations, a torque ripple of the motor at its base speed is approximately +/−3.5% and the torque ripple of the motor at its maximum speed is approximately +/−1.5%. In some implementations, a total harmonic distortion (THD) of the motor at its base speed is approximately 11% and the THD of the motor at its maximum speed is approximately 8%.

According to another example aspect of the invention, an electrified vehicle comprising the motor is presented. In some implementations, the output torque generated by motor is transferred from the output shaft to a driveline of the vehicle via a transmission for vehicle propulsion. In some implementations, the electrified vehicle is a battery electric vehicle (BEV) or a plug-in hybrid electric vehicle (PHEV).

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2A is a first partial cross-sectional view of an example configuration of the permanent magnet electric motor illustrating alternating full and partial-width slot apertures in the stator lamination according to the principles of the present disclosure.

DETAILED DESCRIPTION

Figure 1:
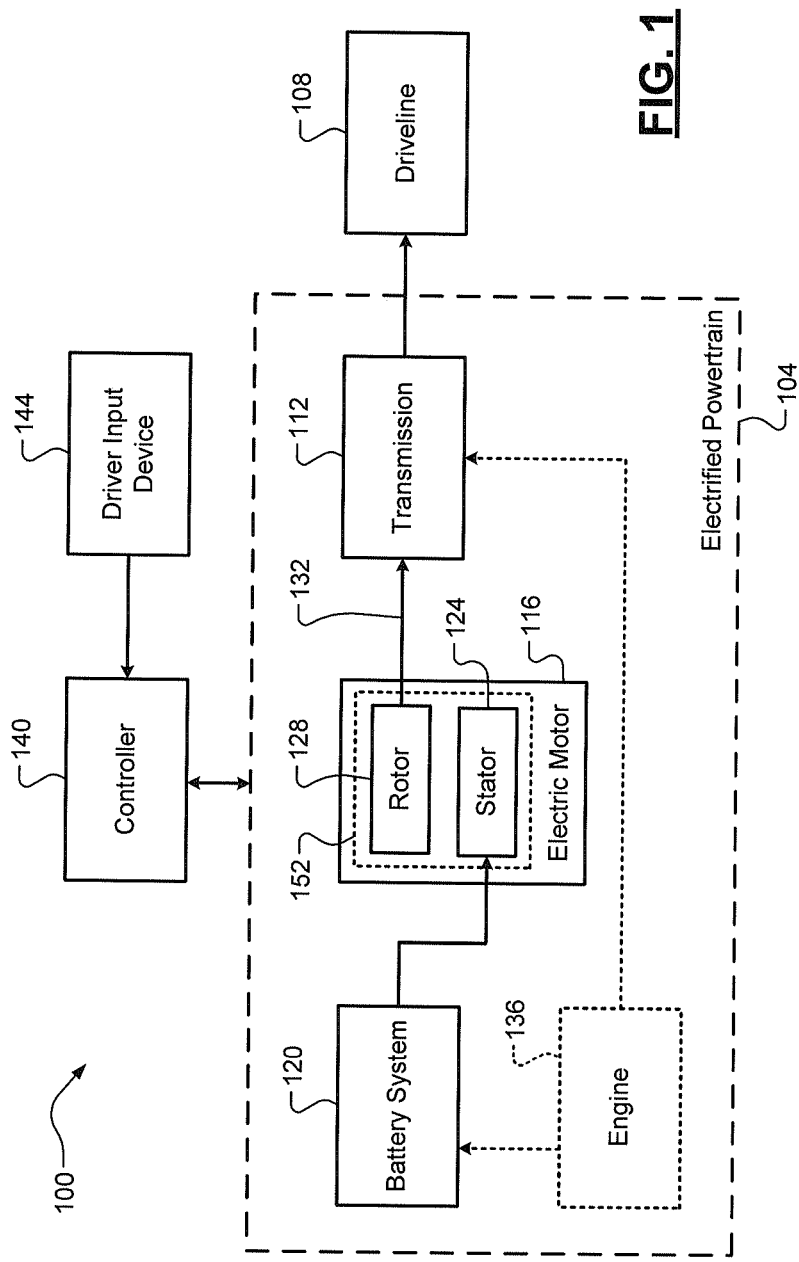
FIG. 1 is a functional block diagram of an electrified vehicle having an example permanent magnet electric motor according to the principles of the present disclosure.

Permanent magnet electric motors are desirable for traction motors in electrified vehicles due to their smaller packaging/weight and their higher efficiency compared to other electric motors, such as induction motors. As previously discussed, permanent magnet electric motors typically suffer from high noise/vibration/harshness (NVH), torque ripple, and/or voltage total harmonic distortion (THD) or direct current (DC) bus voltage oscillations. For high performance electrified vehicle applications, permanent magnet traction motors should be able to output peak torque continuously for a certain period, e.g., 10 seconds. Conventional permanent magnet electric motors designs that are capable of generating these levels of drive torque typically suffer from up to 45% THD as well as large torque ripples and substantial levels of vibration. As a result, conventional permanent magnet electric motors for electrified vehicles are typically designed to mitigate or eliminate these issues, which results in the motors having lower maximum drive torque levels or implementing other costly and complex design/control modifications (stator skew, rotor skew, complex notch designs, complex control techniques, etc.).

Accordingly, improved permanent magnet electric motors for electrified vehicles are presented. These motors have a stator defining N slots in its lamination and a rotor defining M poles, where N equals 6 and M equals 4 or N and M are any "double multiples" thereof (12/8, 24/16, 48/32, etc.). The term "double multiples" as used herein refers to N and M being equal to any values in the sets $\{N_1 \ldots N_x\}$ and $\{M_1 \ldots M_x\}$, respectively, where $N_1=6$ and $N_i=N_{i-1}*2$ and $M_1=4$ and $M_i=M_{i-1}*2$, where i is an integer index from 1 to x, and wherein x could be any positive integer (depending on realistic motor size constraints). The N slots have two sets of N/2 apertures (e.g., holes) defined in an inner surface of the stator lamination associated therewith. These apertures function to both keep respective portions of a round wire in place while also providing an air gap between the stator and a rotor. The first N/2 apertures are full-width or fully-open in that they are the full width of the respective round wire or slot. While these apertures are full-width at the inner surface of the stator lamination, the respective N/2 slots are defined such that they still hold the respective round wires securely in place. The second N/2 apertures are partial-width or partially-open in that they are only a partial-width of the respective round wire or slot. The first and second sets of N/2 apertures are also defined in an alternating fashion. While a round wire design is specifically described herein, it will be appreciated that the teachings of the present disclosure could also apply to other wire designs, such as a bar wire design.

The rotor has a rotor lamination comprising M magnet assemblies each comprising a pair of bar magnets arranged in a V-configuration to define the M poles. The rotor lamination further defines at least three sets of air pockets. In one exemplary implementation, the at least three sets of air pockets comprise: (i) a pair of first air pockets arranged proximate to an outer surface of the rotor lamination and proximate to a neighboring pole of the M poles and a pair of second air pockets and a single third air pocket arranged between the respective pair of bar magnets. In one exemplary implementation, each first air pocket and each second air pocket defines an elliptical shape and each third air pocket defines a circular shape, and the second and third air pockets act as a flux barrier and an optimizing flux path. In one exemplary implementation, each first air pocket is machined into or cut from the outer surface of the rotor lamination and each second and third air pocket is formed by forming larger pockets in the rotor lamination, inserting the bar magnets therein, and then partially filling these larger pockets with a non-magnetic epoxy, resulting in non-filled (air-filled) regions that form the second and third air pockets.

Figure 2B:
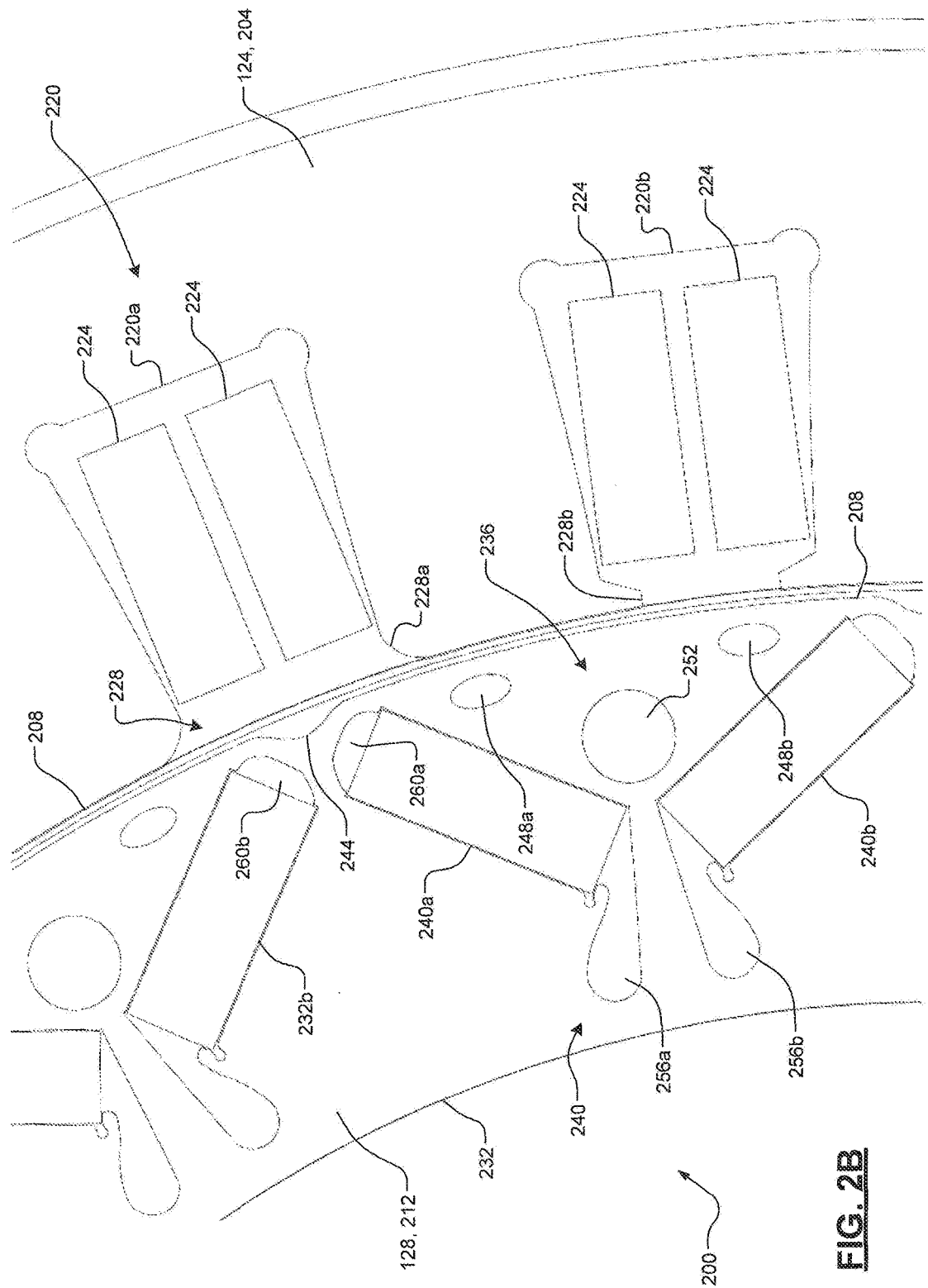
FIG. 2B is a second, further zoomed-in partial cross-sectional view of the example configuration of the permanent magnet electric motor illustrating quantities/locations/shapes of air pockets in the rotor lamination according to the principles of the present disclosure.

In one exemplary design, the motor has a 24 slot, 16 pole configuration and the air pockets shown in FIGS. 2A-2B and described in greater detail below. This motor design is capable of generating (i) approximately 133 Newton-meters (Nm) of drive torque at a base speed (e.g., 5475 revolutions per minute, or RPM) with approximately +/−3.5% voltage ripple and approximately 11% THD (ii) approximately 51 Nm of drive torque at a maximum speed (e.g., 11,000 RPM) with approximately +/−1.5% voltage ripple and approximately 8% THD (or less). It will be appreciated that these torque numbers could be Nm per liter (Nm/L) numbers, depending on the motor size. As shown in FIGS. 2A-2B, this motor design also includes other sets of air pockets proximate to ends of each bar magnet. All of these uniquely designed air pockets, in conjunction with the alternating fully-open and partially-open slot configuration, collectively provide for improved magnetic flux and improved motor performance and efficiency. It will be appreciated that these specific design elements are critical, based on testing data, in order to achieve the above-mentioned motor performance metrics. While this specific configuration is illustrated and described herein, it will also be appreciated that the more general design aspects of the present disclosure could be similarly applicable to other motor configurations (a 12 slot, 8 pole, a 48 slot, 32 pole configuration, a 96 slot, 64 pole configuration, etc.), which could have slightly different slot and/or air pocket arrangements depending on additional testing data.

Referring now to FIG. 1, a functional block diagram of an example electrified vehicle 100 is illustrated. The term "electrified vehicle" as used herein refers to any suitable electrified vehicle including, but not limited to, battery electric vehicles (BEVs) and hybrid electric vehicles (HEVs), such as plug-in HEVs (PHEVs). The vehicle 100 includes an electrified powertrain 104 that generates a drive torque that is transferred to a driveline 108 via a transmission 112. The electrified powertrain 104 comprises a permanent magnet electric motor 116 (hereinafter also, "electric motor 116") that generates the drive torque using current from a battery system 120. The electric motor 116 generally comprises a stator 124 through which the current flows, thereby causing a rotor 128 to rotate and generate drive torque at an output shaft 132. It will be appreciated that the electrified powertrain 104 could optionally include an internal combustion engine 136, such as for recharging the battery system 120. A controller 140 controls operation of the vehicle 100, such as controlling the electrified powertrain 104 to generate a desired amount of drive torque in response to a driver input via a driver input device 144. It will be appreciated that the electric motor 116 could be arranged on either a front or rear axle of the vehicle 100, and it will also be appreciated that multiple electric motors 116 could be implemented, such as one at the front axle and one at the rear axle.

Referring now to FIGS. 2A-2B, a first partial (e.g., quarter) cross-sectional view of an exemplary configuration 200 of the permanent magnet motor 116 and a second partial (e.g., zoomed-in) cross-sectional view of FIG. 2A are illustrated. The stator 124 comprises a stator lamination 204. It will be appreciated that while a single stator lamination 204 is described herein, the stator lamination 204 could be comprised of a plurality of thin lamination sheets stacked and coupled together, e.g., to reduce eddy current losses. For example only, the stator lamination(s) 204 could be comprised of steel. The stator lamination 204 defines an inner surface 208 proximate to the rotor 128, which defines a rotor lamination 212 and an outer surface 216 proximate to the inner surface 208 of the stator lamination 204. The stator lamination 204 also defines the N slots 220, each of which can have one of two configurations (hereinafter 220a and 220b). In the illustrated exemplary configuration 200, the stator lamination 204 defines 24 slots (N=24), but it will be appreciated that the stator lamination 204 could define six slots or any other suitable double multiple thereof (12, 48, 96, etc.). Portions of a round wire 224 are disposed in each slot 220. In one exemplary implementation, the round wire 224 is comprised of copper. The stator lamination 204 further defines holes or apertures 228 extending from ends of the slots 220 through the inner surface 208 of the stator lamination 204.

The different slot configurations 220a, 220b correspond to different aperture configurations (hereinafter, 228a and 228b). A first slot configuration 220a is associated with a first aperture configuration 228a that defines a full-width relative to the slot 220a or the round wire 224 therein. This configuration is also described as a fully-open configuration because the slot 220a is fully-open via the full-width aperture 228a at the inner surface 208 of the stator lamination 204. As shown, this slot configuration 220a also narrows from its outer end towards its inner end before flaring out at the inner surface 208 of the stator lamination. This design is to securely hold the round wire 224 within the slot 220a. A second slot configuration 220b is associated with a second aperture configuration 228b that defines a partial-width relative to the slot 220b or the round wire 224 therein. This configuration is also described as a partially-open configuration because the slot 200b is only partially-open via the partial-width aperture 228b at the inner surface 208 of the stator lamination 204. By providing full and partial-width openings 228a, 228b in the inner surface 208 of the stator lamination 204, magnetic flux between the stator 124 and the rotor 128 is improved and in turn motor performance/efficiency is improved.

The rotor 128 comprises a rotor lamination 212, which could have the same or similar composition as the stator lamination 204 as described above. The rotor lamination 212 defines an outer surface 216 and an inner surface 232. The rotor 128 is slightly spaced apart from the stator 124 such that an air gap or pocket is defined between surfaces 208 and 216 such that the rotor 128 is free to rotate without physically contacting the stator 124. The rotor 128 comprises M poles 236 defined by M permanent magnet assemblies 240 of the rotor lamination 212. These M poles 236 are displaced by the magnetic field or flux generated by passing an electrical current through the round wires 224 in the stator 124, thereby causing rotation of the rotor 128. The rotation of the rotor 128 generates drive torque, which is transferred to the output shaft 132 of the vehicle 100 for propulsion, which will be described in greater detail below. In one exemplary implementation, the rotor lamination 212 comprises 16 poles (M=16), but it will be appreciated that the rotor lamination 212 could comprise four poles or any other suitable double multiple thereof (8, 32, 64, etc.). Each permanent magnet assembly 240 comprises a pair of bar magnets 240a, 240b arranged in a V-configuration (e.g., such that the narrow tip of the V-shape is towards the inner surface 232 of the rotor lamination 212 and in-line with (and forming) the respective pole 236.

The rotor lamination 212 further defines at least three sets of uniquely arranged and shaped air pockets for each of the M poles 236 or permanent magnet assemblies 240. A first air pocket 244 is defined in the outer surface 216 of the rotor lamination 212 and at a point between two neighboring poles 236. It should be noted that while first air pocket 244 is shown as being aligned with slot 220a in FIG. 2B, the location of these first air pockets 244 is with respect to the poles 236 and not the slots 220. In one exemplary implementation, the first air pockets 244 are elliptically-shaped and are machined into or cut from the outer surface 216 of the rotor lamination 212, but it will be appreciated that other suitable manufacturing techniques could be utilized. A pair of second air pockets 248a, 248b and a single third air pocket 252 are all arranged between the respective bar magnets 240a, 240b or, in other words, within the respective pole 236. The pair of second air pockets 248a, 248b are spaced apart and are located towards the outer surface 216 of the rotor lamination 212. The single third air pocket 252 is centrally arranged within the respective pole 236 more towards a center of the rotor lamination 212 (e.g., closer to the narrow tip of the V-configuration). In one exemplary implementation, the second air pockets 248a, 248b are elliptically-shaped and the third air pockets are circularly-shaped.

In one exemplary implementation, these inner air pockets 248a, 248b, and 252 are all formed after the bar magnets 240a, 240b are all inserted into larger pockets (not shown), and these larger pockets could then be partially filled with a non-metallic epoxy. Any remaining or unoccupied (i.e., air filled and not epoxy filled) portions of these larger pockets form the inner air pockets 248a, 248b, and 252. It will be appreciated that some or all of these inner air pockets 248a, 248b, and 252 could be formed in other suitable manners. These inner air pockets 248a, 248b, and 252 act as a flux barrier and optimize a flux path from the stator 124 to the rotor 128, thereby improving motor performance/efficiency. In some implementations, the rotor lamination 212 further defines at least two additional sets of air pockets for each of the M poles 236 or permanent magnet assemblies 240. For example, a pair of fourth air pockets 256a, 256 could be arranged proximate to or at inner ends of the respective bar magnets 240a, 240b and a pair of fourth air pockets 260a, 260b could be arranged proximate to or at opposing outer ends of the respective bar magnets 240a, 240b. These air pockets 256a, 256b, 260a, and 260b could be uniquely shaped based on testing and could be formed in the same or similar manner as air pockets 248a, 248b, and 252, and the resulting benefit of these additional air pockets 256a, 256b, 260a, and 260b could be further improved flux linkage and in turn the motor's performance/efficiency.

Referring again to FIG. 1 and with continued reference to FIGS. 2A-2B, the inner surface 232 of the rotor lamination 212 is coupled or otherwise connected to the output shaft 132 as previously discussed. The battery system 120 outputs a DC current, which is converted to an AC current by an inverter (not shown). For example, a fundamental frequency of the AC current may be approximately 60 hertz. The AC current is provided to the round wire 224, which causes a magnetic field to be generated. This magnetic field displaces the permanent magnet assemblies 240, thereby causing the rotor 128 to rotate. The rotation of the rotor 128 in turn causes the output shaft 132 to rotate, thereby producing drive torque that is transferred to the driveline 108 of the vehicle 100 via its transmission 112 to propel the vehicle 100. As previously discussed, the illustrated example of the electric motor 116 (with a 24 slot, 16 pole configuration and the above-mentioned air pocket configurations) is capable of generating approximately 133 Nm at a base speed (e.g., ~5475 RPM) with very low torque ripple of approximately +/−3.5% and very low THD of approximately 11% and approximately 51 Nm at a maximum speed (e.g., ~11,000 RPM) with very low torque ripple of approximately +/−1.5% and very low THD of approximately 8% (or less). The THD represents a harmonic component of the AC motor voltage, which is expected to be a sine wave (e.g., ~60 hertz), and comprises a sum of the inductive voltage and back electromotive force (EMF).

High levels of THD, such as the 45% THD (or more) found in conventional motor designs, negatively affect motor performance in various ways. First, these harmonics reduce the efficiency of the motor (e.g., by making it harder to magnetize the materials in the stator/rotor), causing higher eddy current and hysteresis losses. At very high frequency THD, these losses can even compound. These losses also manifest as additional heat, which adds stress to the motor and could degrade winding insulation, cause lubricants (e.g., oil) to lose lubricity, thereby potentially causing damage to the motor and/or reducing the motor's life. This heat could also potentially trip thermal protection systems. These harmonics may also trigger bearing currents, which cause arcing that creates a rougher surface and increase friction losses and could cause bearing seizure. This could also accelerate the breakdown of the lubricants as discussed above. Harmonics with high voltage change rates, such as notching or ringing, may also cause partial-discharge arcing in the windings, thereby accelerating winding insulation breakdown as discussed above. Lastly, high harmonic content can lower the motor's power factor. For all of these reasons, a motor design with very low THD is desired.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A permanent magnet electric motor configured to generate an output torque for a vehicle, the motor comprising:
    a stator comprising a round wire defining N portions and a stator lamination defining an inner surface, N slots, and N/2 apertures in the inner surface, the N/2 apertures being aligned with and adjacent to every other of the N slots and being full-width relative to the respective N/2 slots, wherein the N portions of the round wire are disposed in the N slots, respectively; and
    a rotor comprising:
        M permanent magnet assemblies defining M respective poles, each of the M permanent magnet assemblies comprising a pair of bar magnets arranged in a V-shaped configuration with respect to each other, wherein N equals 24 and M equals 16; and
        a rotor lamination having the M permanent magnet assemblies disposed therein and defining, for each of the M permanent magnet assemblies, at least three sets of air pockets disposed proximate to the respective permanent magnet assembly,
    wherein the output torque of the motor at its base speed is approximately 133 Newton-meters (Nm), and the output torque of the motor at its maximum speed is approximately 51 Nm.

2. The motor of claim 1, wherein the at least three sets of air pockets comprise at least:
    a pair of first air pockets arranged proximate to an outer surface of the rotor lamination and between two neighboring poles of the M poles; and
    a pair of second air pockets and a single third air pocket arranged within the respective one of the M poles between the respective pair of bar magnets.

3. The motor of claim 2, wherein the first and second air pockets each define an elliptical shape, and wherein the third air pockets define a circular shape.

4. The motor of claim 3, wherein the second and third air pockets act as a flux barrier and an optimizing flux path.

5. The motor of claim 3, wherein the first air pockets are machined into or cut from the outer surface of the rotor lamination.

6. The motor of claim 3, wherein each second and third air pocket is formed by first forming larger pockets in the rotor lamination, inserting the bar magnets therein, and then partially filling the larger pockets with a non-metallic epoxy, wherein non-filled portions of these larger pockets form the second and third air pockets.

7. The motor of claim 1, wherein the stator lamination further defines another N/2 apertures for a remaining N/2 slots of the N slots, and wherein the other N/2 apertures are partial-width apertures relative to the respective N/2 slots.

8. The motor of claim 1, wherein:
    a torque ripple of the motor at its base speed is approximately +/−3.5%; and
    the torque ripple of the motor at its maximum speed is approximately +/−1.5%.

9. The motor of claim 1, wherein:
    a total harmonic distortion (THD) of the motor at its base speed is approximately 11%; and
    the THD of the motor at its maximum speed is approximately 8%.

10. An electrified vehicle comprising the motor of claim 1.

11. The electrified vehicle of claim 10, wherein the output torque generated by motor is transferred from an output shaft of the motor to a driveline of the vehicle via a transmission for vehicle propulsion.

12. The electrified vehicle of claim 11, wherein the electrified vehicle is a battery electric vehicle (BEV) or a plug-in hybrid electric vehicle (PHEV).

* * * * *